(12) United States Patent
Ashtiani et al.

(10) Patent No.: US 7,667,438 B2
(45) Date of Patent: Feb. 23, 2010

(54) ENERGY STORAGE SYSTEM WITH ULTRACAPACITOR AND SWITCHED BATTERY

(75) Inventors: Cyrus N Ashtiani, West Bloomfield, MI (US); Thomas A Stuart, Toledo, OH (US)

(73) Assignees: Chrysler Group LLC, Auburn Hills, MI (US); University of Toledo, Toledo, OH (US)

( * ) Notice: Subject to any disclaimer, the term of this patent is extended or adjusted under 35 U.S.C. 154(b) by 360 days.

(21) Appl. No.: 11/271,596

(22) Filed: Nov. 10, 2005

(65) Prior Publication Data

US 2006/0098390 A1 May 11, 2006

Related U.S. Application Data

(60) Provisional application No. 60/626,560, filed on Nov. 10, 2004.

(51) Int. Cl.
*H02J 7/00* (2006.01)
(52) U.S. Cl. ........................................ 320/167; 320/104
(58) Field of Classification Search ................ 320/102, 320/103, 104, 166, 167
See application file for complete search history.

(56) References Cited

U.S. PATENT DOCUMENTS

| 6,075,331 | A | * | 6/2000 | Ando et al. | 318/376 |
|---|---|---|---|---|---|
| 6,230,496 | B1 | | 5/2001 | Hofmann et al. | |
| 6,497,974 | B2 | | 12/2002 | Fuglevand | |
| 6,651,759 | B1 | | 11/2003 | Gruenwald et al. | |
| 6,683,389 | B2 | | 1/2004 | Geis | |
| 6,753,673 | B2 | * | 6/2004 | Shiue et al. | 320/117 |
| 6,806,686 | B1 | | 10/2004 | Thrap | |
| 6,984,295 | B2 | * | 1/2006 | Shiue et al. | 204/230.8 |
| 7,186,473 | B2 | * | 3/2007 | Shiue et al. | 429/7 |
| 2003/0184258 | A1 | * | 10/2003 | VonderHaar | 320/103 |
| 2003/0214269 | A1 | * | 11/2003 | Shiue et al. | 320/166 |
| 2004/0036449 | A1 | * | 2/2004 | Bean et al. | 320/166 |
| 2005/0083020 | A1 | * | 4/2005 | Baarman | 320/166 |
| 2006/0023480 | A1 | * | 2/2006 | Plummer | 363/146 |

OTHER PUBLICATIONS

US Dept of Energy, "FreedomCAR 42V Battery Test Manual", Apr. 2003.

* cited by examiner

*Primary Examiner*—Edward Tso
*Assistant Examiner*—Arun Williams
(74) *Attorney, Agent, or Firm*—Ralph E. Smith

(57) ABSTRACT

An energy storage system for a vehicle includes an ultracapacitor that is electrically coupled in parallel with a battery through a diode connected in series with the battery. The ultracapacitor delivers the energy required for all high current surges that occur during engine start, acceleration, and regeneration. The battery is used only to assist with longer duration, high energy loads, such as accessory loads when an engine of the vehicle is not running. In other words, the battery conducts only during longer and less-frequent pulses and, therefore, does not have to withstand high-power pulses.

11 Claims, 2 Drawing Sheets

ENERGY STORAGE SYSTEM WITH ULTRACAPACITOR AND SWITCHED BATTERY

CROSS-REFERENCE TO RELATED APPLICATIONS

This application claims benefit of U.S. provisional patent application No. 60/626,560 filed Nov. 10, 2004, the disclosure of which is hereby incorporated by reference.

FIELD OF THE INVENTION

The invention relates generally relates to vehicle energy storage systems, particularly energy storage systems suitable for use in hybrid electric vehicles.

BACKGROUND OF THE INVENTION

Hybrid electric vehicles (HEVs), whose operation is characterized by both discharge and regenerative tractive electrical loads and nontractive electrical loads, often employ batteries to provide energy boost or storage for short periods such as acceleration, engine start-up, and regenerative braking, as well as for relatively-longer-duration discharge pulses. As a result, the batteries experience very high and frequent surge currents and, therefore, must withstand thousands of deep charge/discharge cycles which can potentially impact battery life. Further, such batteries must be optimized for high-power capability, generally resulting in a substantially increased cost.

In response, the prior art teaches use of energy storage systems featuring double-layer capacitors, also known as supercapacitors or ultracapacitors, that are electrically coupled in parallel with a battery as shown in FIG. 1, to handle rapid transients while the batteries handle lengthy demand peaks and provide long-term energy storage. These ultracapacitors behave like high-power, low-capacity batteries, except that ultracapacitors store electric energy by accumulating and separating unlike-charges physically, rather than storing energy chemically in reversible chemical reactions. As such, ultracapacitors can provide high power and can accept high power during charging, even as their instantaneous voltage approaches their maximum rated voltage. Advantageously, ultracapacitors also typically feature a high cycle life and a high cycle efficiency, as compared to commercially-available chemical batteries.

Referring again to FIG. 1, with the ultracapacitor UC and the battery B connected in parallel, and assuming both a constant simulated switched load current $I_L$ (to simplify the following analysis) and a parasitic series resistance $R_C, R_B$ of both the ultracapacitor and the battery, upon the closure of switch S1 at time t=0, the capacitor and battery currents $i_C, i_B$, are calculated as follows:

$$i_C = I_L\left[\frac{R_B e^{-t/\tau}}{R_B + R_C}\right] \quad (1)$$

$$i_B = I_L\left[1 - \frac{R_B e^{-t/\tau}}{R_B + R_C}\right] \quad (2)$$

where $\tau = (R_B + R_C)C$ is the circuit time constant (3)

The resulting peak value $I_{Lmax}$ for the switched load current $I_L$ at time t=0 is calculated as:

$$I_{Lmax} = \frac{V_B}{\left(\frac{R_B R_C}{R_B + R_C}\right)} = \frac{V_B}{R_B} + \frac{V_B}{R_C} \quad (4)$$

Thus, if the resistance $R_C$ of the ultracapacitor is significantly less than the resistance $R_B$ of the battery, the prior art's teaching of the parallel coupling of the ultracapacitor and the battery, as shown in FIG. 1, advantageously provides a higher maximum switched load current $I_{Lmax}$ (thereby improving vehicle cold weather starting) while a correlative reduction of battery current $i_B$ pulse amplitudes reduces degradation of the battery.

By way of further example, assuming a resistance $R_C$ for the ultracapacitor of 10 mΩ at 25° C. and 11.5 mΩ at –30° C., and a resistance $R_B$ for the battery of 54 mΩ at 25° C. and 180 mΩ at –30° C., Equations (1) and (2) demonstrate that, as the ultracapacitor current $i_C$ decreases in response to longer-duration or higher-energy discharge pulses, the battery current $i_B$ will increase, particularly at relatively higher ambient temperatures:

@25° C.: $I_{C\ max}$=5.4$I_{B\ max}$

@–30° C.: $I_{C\ max}$=15.65$I_{B\ max}$

Thus, for a ten-second vehicle start/acceleration pulse for a power-assist hybrid electric vehicle (P-HEV), as set forth in P-HEV Power & Energy Design Verification Load Profile published by the U.S. Department of Energy in the "Freedom-CAR 42V Battery Test Manual" (April 2003), reproduced in FIG. 2A, Equations (1)-(3) yield the following:

$\tau$=9.3 sec@25° C.

$i_C$=29% of $I_L$@t=10 sec $i_B$=71% of $I_L$@t=10 sec $\tau$=27.8 sec@–30° C.

$i_C$=66% of $I_L$@t=10 sec $i_B$=34% of $I_L$@t=10 sec

The foregoing confirms that known energy storage systems featuring a parallel-coupled ultracapacitor and battery provide much higher discharge pulses than an energy storage system featuring a battery alone.

However, the foregoing also confirms that the parallel-coupled ultracapacitor and battery results in a battery current $i_B$ portion of the switched load current $I_L$ being very high, particularly with increasing ambient temperature. And, while the ultracapacitor generally has very high immunity to high discharge and regenerative pulses such as vehicle start/acceleration pulses and regenerative braking, known chemical batteries typically do not share such a high immunity, and such shared pulses can therefore cause significant degradation of the parallel-coupled batteries due to battery cycling.

BRIEF SUMMARY OF THE INVENTION

It is an object of the invention to provide an energy storage system for a hybrid electric vehicle, whose operation is characterized by relatively-higher discharge and regenerative tractive electrical loads and relatively-lower nontractive electrical loads, in which an ultracapacitor is electrically coupled to battery in such a way as to generally shield the battery from high-current, low-duration discharge and regeneration pulses occurring during normal vehicle operation until the ultracapacitor is substantially discharged, to thereby reduce battery cycling.

In accordance with an aspect of the invention, an energy storage system for a hybrid electric vehicle includes an ultracapacitor having a maximum operating voltage, and a battery electrically coupled in parallel to the ultracapacitor through a series-connected diode. Significantly, the battery has a maximum voltage that is substantially less than the ultracapacitor's maximum operating voltage. The ultracapacitor will therefore process the energy associated with most short-duration, high-current tractive surges/pulses that occur during engine start, acceleration, and regeneration, without dropping the instantaneous voltage of the ultracapacitor to the point where the battery begins to process the energy.

Because the battery current remains nominally zero in response to a long-duration and/or high-current pulse until the instantaneous ultracapacitor voltage drops to the instantaneous battery voltage, the battery only assists with longer-duration, high-energy tractive loads, or with accessory loads as may be encountered when a system-regenerating power source on the vehicle, e.g., a hydrocarbon-fueled engine or fuel cell, is not operating. In other words, the system's battery conducts only during longer and less-frequent loads, thereby substantially reducing battery cycling.

Where the battery is a lead-acid battery, a further advantage is that the battery does not have to be kept at a partial state of charge, e.g., at a seventy-percent state of charge, in order to accept regenerative pulses but, rather, can be maintained close to a one-hundred percent state of charge which, together with the reduction in surge currents, greatly reduces the sulfation process which may lead to a premature failure of such lead-acid batteries.

Preferably, the maximum voltage of the battery is roughly one-half of the maximum operating voltage of the ultracapacitor; or, stated another way, the maximum operating voltage of the ultracapacitor is preferably roughly twice the maximum voltage of the battery. Having a maximum operating voltage for the ultracapacitor that is roughly twice that of the battery advantageously allows use of up to perhaps three-quarters of the energy stored in the ultracapacitor before the battery is even engaged.

In accordance with another aspect of the invention, the energy storage system preferably further includes a battery-charging circuit which selectively electrically couples the battery in parallel with the ultracapacitor when both the battery voltage has dropped below a minimum battery voltage and the ultracapacitor voltage is approximately equal to the battery voltage to thereby allow the battery to be charged by a regenerative pulse or other charging current, for example, as generated by an alternate power source such as an alternator/generator driven by an internal combustion engine or fuel cell on the vehicle. While the invention contemplates use of any suitable battery-charging circuit, by way of example only, a battery-charging circuit includes a normally-open switch operative to shunt the series diode, and a controller adapted to operate the switch and charge the battery when a detected instantaneous battery voltage is roughly equal to a detected instantaneous ultracapacitor voltage. The controller is further preferably adapted to open the diode-shunting switch to discontinue battery charging when the battery voltage has been raised to its target level, e.g., roughly one-half of the maximum operating voltage of the ultracapacitor.

Still further, the controller is preferably adapted to switch on the inverter to reduce the instantaneous ultracapacitor voltage to the instantaneous battery voltage prior to closing the diode-shunting switch. Alternatively, the battery-charging circuit preferably further includes a separate, normally-open-switched bleed circuit across the ultracapacitor leads; and the controller is adapted to close the bleed circuit to dissipate charge and thereby reduce the detected ultracapacitor voltage to the detected battery voltage, prior to closing the diode-shunting switch.

In accordance with yet another aspect of the invention, the hybrid electric vehicle may advantageously feature a separate electrical bus by which generally-low-power, nontractive electrical loads are coupled to the battery alone, whereby the high-power high-cycle discharge and regenerative tractive loads fall on the previously-described parallel-coupled ultracapacitor and battery with series diode, while relatively-steady, low-power vehicle loads fall on the battery alone.

Other objects, features, and advantages of the invention will be readily appreciated upon a review of the subsequent description of the preferred embodiment and the appended claims, taken in conjunction with the accompanying Drawings.

BRIEF DESCRIPTION OF THE DRAWINGS

The invention will become more fully understood from the detailed description and the accompanying drawings, wherein.

DETAILED DESCRIPTION OF THE INVENTION

The following description of the preferred embodiment(s) is merely exemplary in nature and is in no way intended to limit the invention, its application, or uses.

Figure 3:
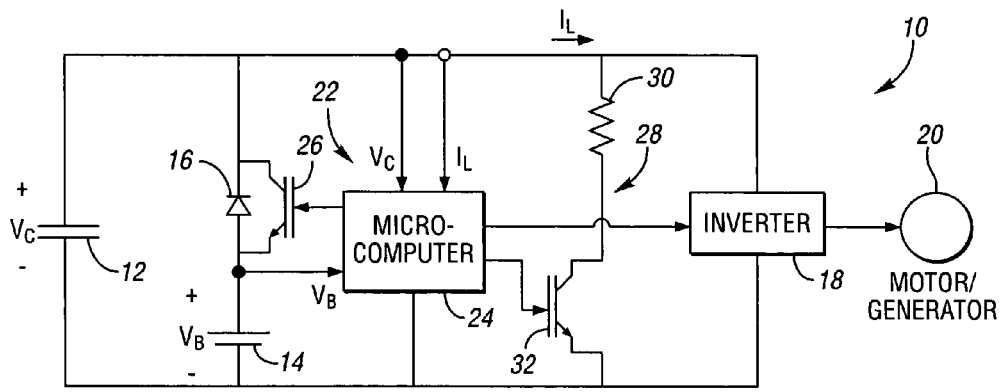
FIG. 3 is a circuit diagram for an exemplary energy storage system in accordance with the invention, which includes an ultracapacitor that is parallel-coupled with a battery through a diode.

Referring to the circuit diagram shown in FIG. 3, an exemplary energy storage system 10 in accordance with the invention, for use in a hybrid electric vehicle, includes an ultracapacitor 12, and a battery 14 that is electrically coupled in parallel with the ultracapacitor 12 through a series-connected diode 16. For purposes of the invention, the term "ultracapacitor" encompasses electrostatic multiple-layer capacitors (singly or in parallel and/or series combinations), as well as capacitors (single capacitors or parallel and/or series combinations of capacitors) with capacitances above 1 F. It will be appreciated that, when multiple series-connected ultracapacitors are used, the energy storage system preferably includes charge-balancing circuitry (not shown) to prevent against inadvertent overcharging of a given one of the ultracapacitors due to an imbalance of energy between the multiple series ultracapacitors. Similarly, the term "battery" is intended to encompass battery packs that include multiple batteries connected in series and/or in parallel.

The ultracapacitor 12 has a maximum voltage rating $V_{Cmax}$ and is preferably sized to deliver the energy required for all high-current discharge and regenerative pulses/surges that occur during normal vehicle operation, including the start-up of any associated internal combustion engine (not shown), typical vehicle acceleration, and regenerative vehicle braking.

Figure 2A:
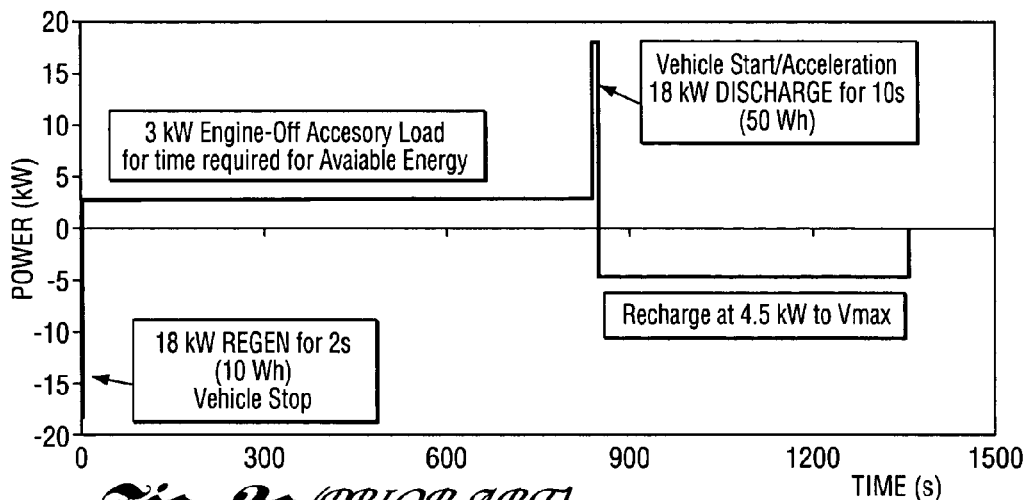
FIGS. 2A and 2B are the power and energy design verification load profiles for P-HEVs and M-HEVs, respectively, as set forth in the "FreedomCAR 42V Battery Test Manual" (April 2003)
Figure 2B:
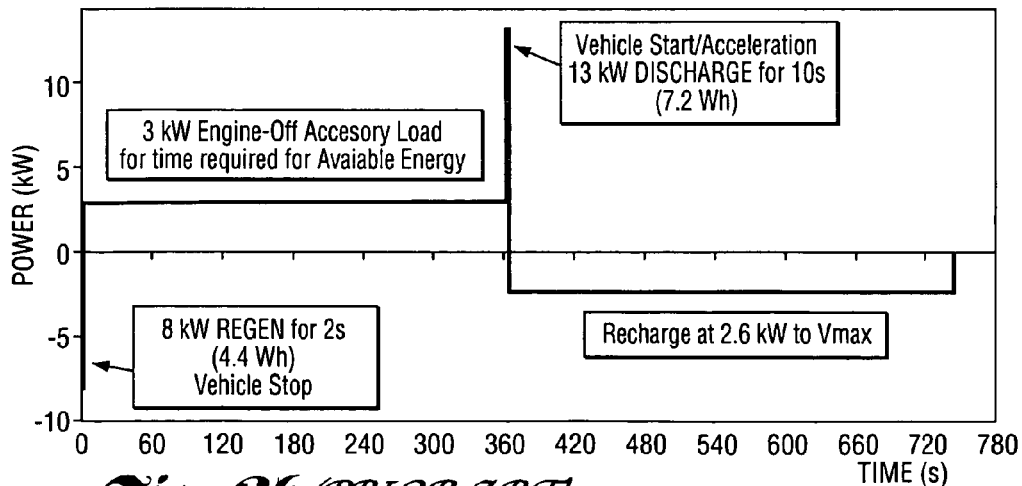

By way of example only, as described more fully below, for a full-power-assist hybrid electric vehicle (P-HEV) having a 24V electrical bus for nontractive loads and a power and energy design verification load profile as shown in FIG. 2A, a suitable ultracapacitor 12 (or several suitably-interconnected ultracapacitors) has a maximum rated voltage $V_{Cmax}$ of perhaps about 50V, a rated capacitance of perhaps about 290 F, and is preferably controlled to a target or "nominal" voltage $V_{Cnom}$ of perhaps about 40V to provide both sufficient capacity for start/acceleration discharge pulses and enough "headroom" for storing anticipated regenerative pulses. Similarly, for a mild hybrid electric vehicle (M-HEV) having a 24V electrical bus for nontractive loads and a power and energy design verification load profile as shown in FIG. 2B, a suitable ultracapacitor 12 may have a maximum rated voltage $V_{Cmax}$ of perhaps about 50V, a rated capacitance of perhaps about 145 F, and is preferably controlled to a nominal voltage $V_{Cnom}$ of 40V.

In accordance with an aspect of the invention, the diode 16 operates to isolate the battery 14 from the load (represented by an inverter 18 and a motor/generator 20) as long as the ultracapacitor's voltage $V_C$ exceeds the battery voltage $V_B$. Thus, the system's battery 14 is used only to assist with the longer-duration, high-energy loads, including vehicle start/acceleration pulses (as illustrated in the load profiles shown in FIGS. 2A and 2B), and to power "engine-off" accessory loads.

Referring again to FIG. 3, the energy storage system 10 further includes a battery-charging circuit 22 which is operative to selective electrically couple the battery 14 in parallel with ultracapacitor 12 to permit the charging of the battery 14, either with a regulated regenerative pulse generated by the motor/generator 20 through the inverter 18, or with another regulated current, for example, generated by an alternate power source on the vehicle, such as an internal combustion engine or fuel cell (not shown), but only when both the battery voltage $V_B$ has dropped below a minimum battery voltage $V_{Bmin}$ and the ultracapacitor voltage $V_C$ is approximately equal to the battery voltage $V_B$. Thus, the battery-charging circuit 18 is shown in FIG. 3 as including a controller 24 that is adapted to close a first normally-open transistor 26 shunting the diode 16 when the detected battery voltage $V_B$ has dropped below the minimum battery voltage $V_{Bmin}$ and is roughly equal to the detected instantaneous ultracapacitor voltage $V_C$. In this way, the controller 24 only periodically closes the first transistor 16 to recharge the battery 14 back to its maximum battery voltage $V_{Bmax}$.

In order to avoid damage to the battery-charging circuit's first transistor 26, when necessary, the controller 24 is advantageously adapted to selectively turn on the inverter 18 to thereby reduce the instantaneous ultracapacitor voltage $V_C$ to the detected instantaneous battery voltage $V_B$, prior to closing the first transistor 26. The system's battery-charging circuit 22 also advantageously includes a switched bleed circuit 28 connecting the leads of the ultracapacitor 12. The switched bleed circuit 28 includes a resistor 30 and a second normally-open transistor 32, and the controller 24 is adapted to close the second transistor 32 to thereby bleed a relatively small amount of charge from the ultracapacitor 12 prior to closing the first transistor 26 (to charge the battery 14), in order to protect the first transistor 26.

Further, where the first transistor 26 is a relatively-low-cost transistor rated for a relatively-low battery charging current, if a boost or regenerative pulse is needed by the vehicle at a time when the controller 24 has closed the first transistor 26 to effect battery charging, a signal is sent to the controller 24 from an external powertrain controller (not shown), whereupon the controller 24 opens the first transistor 26 before the inverter 18 is allowed to create the pulse. Because this action is electronic, the opening of the first transistor 26 by the controller 24 occurs sufficiently quickly so as not to cause any significant delay in the mechanical response of the vehicle.

Figure 1:
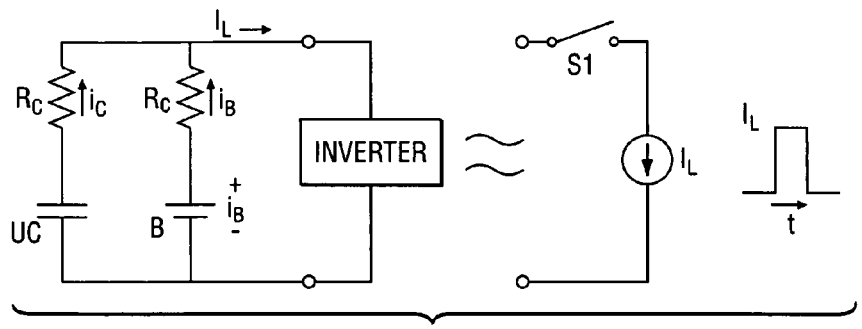
FIG. 1 is a circuit diagram for a prior art energy storage system featuring a parallel-coupled ultracapacitor and battery.

A main advantage of the energy storage system 10 of the invention over the prior art system of FIG. 1 is that the battery 14 is shielded by the diode 16 from most pulses, including regenerative braking current pulses, until the instantaneous ultracapacitor voltage $V_C$ drops to the instantaneous battery voltage $V_B$. Thus, the system's battery 14 is advantageously optimized for energy storage rather than power capability, thereby significantly lowering the size, weight and cost of the system's battery 14, while further reducing battery cycling to improve battery life and reliability.

As a further advantage over the prior art system of FIG. 1, the energy storage system 10 allows a much better utilization of the ultracapacitor 12 because the ultracapacitor 12 can be discharged to roughly half of its maximum useable voltage, i.e., to the battery's maximum voltage $V_{Bmax}$ before the ultracapacitor's discharge is slowed by an accompanying battery current. For longer switched load current pulses $I_L$, which would otherwise discharge the ultracapacitor voltage $V_C$ to less than the maximum battery voltage $V_{Bmax}$, the diode 16 begins to conduct when the instantaneous ultracapacitor voltage $V_C$ drops to the instantaneous battery voltage $V_B$. This restricts the ultracapacitor voltage $V_C$ generally to the range $V_B \leq V_C \leq 2V_B$, which can be tolerated by the inverter load.

Short duration, and more frequent switch load current pulses $I_L$ are supplied only by the ultracapacitor 12 as long as the ultracapacitor voltage $V_C$ is greater than the battery voltage $V_B$. Since the battery 14 conducts only during longer and less frequent pulses, the battery 14 does not have to be designed to accommodate short-duration, high-power pulses. The ultracapacitor 12 is also sized to accept regeneration pulses, where the switched load current $I_L$ is reversed.

Figure 4:
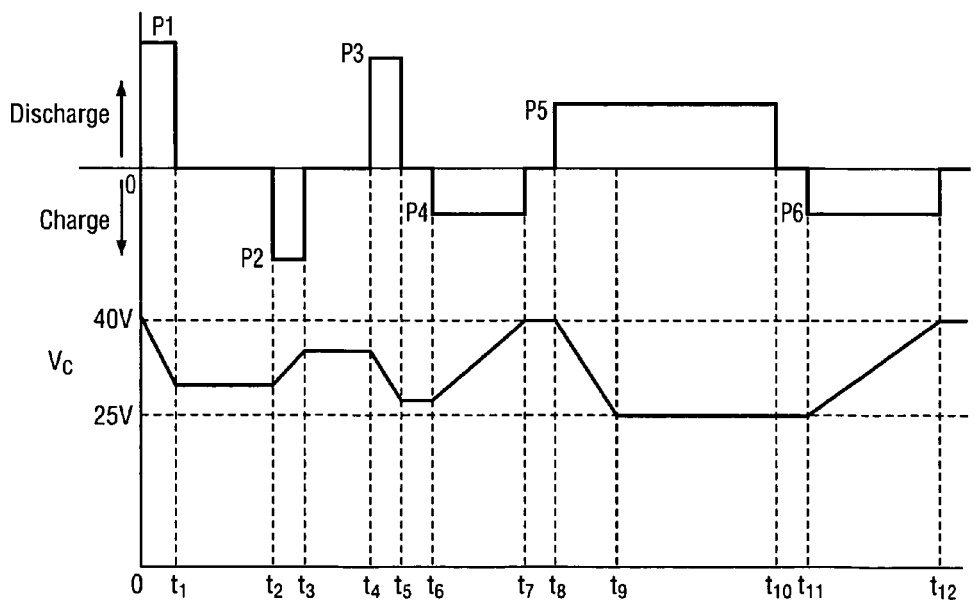
FIG. 4 is a plot showing switch load current $I_L$ and capacitor voltage $V_C$ versus time waveforms for the exemplary energy storage system of FIG. 3.

With reference to FIG. 4, switched load current $I_L$ and ultracapacitor voltage $V_C$ versus time waveforms are used to explain a typical cycle for the energy storage system 10. In this example, the ultracapacitor 12, which has a maximum voltage $V_{Cmax}$ of about 50V, is periodically recharged to a target or "nominal" voltage $V_{Cnom}$ of perhaps about 40V to thereby maintain some "headroom" for regeneration pulses that may occur while the ultracapacitor is charged to the nominal voltage $V_{Cnom}$. A first switched load current $I_L$ discharge pulse P1 at (t=0) lowers the ultracapacitor voltage $V_C$, whereupon a first regenerative pulse P2 (from $t_2$ to $t_3$) causes the ultracapacitor voltage $V_C$ to increase. A second discharge pulse P3 (from $t_4$ to $t_5$) then causes a further ultracapacitor voltage $V_C$ decrease, whereupon the system 10 then senses that the ultracapacitor voltage $V_C$ needs to be increased at $t_6$ and applies a second regenerative pulse P4 (from $t_6$ to $t_7$) to raise the ultracapacitor voltage $V_C$ back to its nominal voltage $V_{Cnom}$ of 40V.

Beginning at $t_8$, a long, third discharge pulse P5 occurs that discharges the ultracapacitor voltage $V_C$ to the battery voltage $V_B$ (which happens to be at maximum state of charge, i.e., at 25V). Beginning at $t_9$, the battery 14 supplies the remainder of the long discharge pulse P5 via the diode 16 until the pulse P5 ends at $t_{10}$. At $t_{11}$, the system 10 again senses that the ultracapacitor voltage $V_C$ needs to be increased and applies a third regenerative pulse P6 until the ultracapacitor voltage $V_C$ reaches 40V (at $t_{12}$). If successive regeneration pulses charge the ultracapacitor above its target voltage $V_{Cnom}$ of 40V, the ultracapacitor voltage $V_C$ can quickly be discharged to 40V by turning on the inverter load (power assist).

To further emphasize the information presented in FIG. 4, in an energy storage system 10 for a M-HEV featuring a battery 14 having a maximum battery voltage $V_{Bmax}$ of 25V, and an ultracapacitor 12 with a rated capacitance of 145 F and a maximum operating voltage $V_{Cmax}$ of 50V that is controlled during normal vehicle operation to a nominal voltage $V_{Cnom}$ of 40V, the ultracapacitor's maximum regeneration capacity and maximum load capacity is calculated as follows:

$$\text{Maximum Regeneration Capacity} = \frac{1}{2} C(V_{Cmax}^2 - V_{Cnom}^2)$$
$$= \frac{1}{2}(145)(50^2 - 40^2)$$
$$= 65{,}250 \ J$$

$$\text{Maximum Load Capacity} = \frac{1}{2} C(V_{Cnom}^2 - V_B^2)$$
$$= \frac{1}{2}(145)(40^2 - 25^2)$$
$$= 70{,}687 \ J$$

This system 10 will thus easily accommodate the 8 kW, two-second (16,000 J) specified regeneration pulse for a M-HEV as shown in FIG. 2B, and the corresponding engine start/acceleration 13 kW, two-seconds (26,000 J) discharge pulse. In fact, these pulses could easily be accommodated by an ultracapacitor 12 having a rated capacitance of 70 F.

Similarly, the 18 kW, ten-second (180,000 J) vehicle start/acceleration discharge pulse for a P-HEV in FIG. 2A is much more demanding, but is readily accommodated by an energy storage system 10 in accordance with the invention that incorporates an ultracapacitor rated at 290 F when controlling the nominal ultracapacitor voltage $V_{Cnom}$ to 46V, as the system 10 would then provide a maximum ultracapacitor regeneration capacity of 55,680 J (well in excess of the 36,000 J regeneration pulse specified for P-HEVs) and a maximum ultracapacitor Load Capacity of 216,195 J (again, well in excess of the 180,000 J vehicle start/acceleration discharge pulse specified for P-HEVs).

While the above description constitutes the preferred embodiment, it will be appreciated that the invention is susceptible to modification, variation and change without departing from the proper scope and fair meaning of the subjoined claims. For example, while a single switched load is illustrated in FIG. 3, the invention contemplates use of a second bus supported exclusively by the system's battery. In this way, the first bus for tractive loads features a swinging voltage that allows a great majority of the ultracapacitor's energy to be used before drawing current from the battery; and the second bus provides a closely-regulated voltage for the vehicle's other, nontractive loads.

What is claimed is:

1. An energy storage system for a hybrid electric vehicle, wherein the vehicle includes a regenerative energy source generating regenerative pulses for charging the energy storage system, the energy storage system comprising:
   an ultracapacitor having a maximum operating voltage and a minimum operating voltage;
   a battery having a maximum voltage that is greater than the ultracapacitor's minimum operating voltage and substantially less than the ultracapacitor's maximum operating voltage; and
   a diode connected in series with the battery,
   wherein the ultracapacitor is electrically coupled in parallel with the series-connected battery and diode both when charging the ultracapacitor with regenerative pulses and when discharging the ultracapacitor in the absence of regenerative pulses, whereby the battery is generally shielded from high-current regenerative pulses.

2. The energy storage system of claim 1, wherein the maximum voltage of the battery is perhaps about one-half of the maximum operating voltage of the ultracapacitor.

3. The energy storage system of claim 1, wherein the ultracapacitor is periodically charged with a regenerative pulse to a nominal voltage significantly greater than the maximum voltage of the battery but significantly less than the maximum operating voltage of the ultracapacitor.

4. The energy storage system of claim 3, wherein the nominal voltage of the ultracapacitor is greater than an average voltage based on the maximum operating voltage of the ultracapacitor and the maximum voltage of the battery.

5. The energy storage system of claim 1, wherein the battery has a minimum operating voltage, and wherein the battery is recharged by a regenerative pulse when an instantaneous battery voltage drops below the maximum operating voltage of the battery.

6. The energy storage system of claim 5, wherein the battery is periodically charged with a regenerative pulse to the maximum voltage of the battery.

7. The energy storage system of claim 5, including a battery-charging circuit for selectively electrically coupling the battery in parallel with the ultracapacitor when the instantaneous battery voltage drops to the minimum operating voltage of the battery.

8. The energy storage system of claim 7, wherein the battery-charging circuit includes a first normally-open switch operative to shunt the diode, and a controller adapted to close the first switch when both the instantaneous battery voltage drops to the minimum operating voltage of the battery, and an instantaneous ultracapacitor voltage is approximately equal to the instantaneous battery voltage.

9. The energy storage system of claim 8, wherein the controller is further operative to open the first switch when the instantaneous battery voltage has been raised to a target battery voltage.

10. The energy storage system of claim 9, wherein the target battery voltage is approximately equal to the maximum voltage of the battery.

11. The energy storage system of claim 8, wherein the first switch is a transistor, and wherein the controller is adapted to discharge the ultracapacitor to a voltage approximately equal to the instantaneous battery voltage before closing the first switch.

* * * * *